J. S. WARD.
GARDEN IMPLEMENT.
APPLICATION FILED NOV. 9, 1912.
1,089,298.
Patented Mar. 3, 1914.
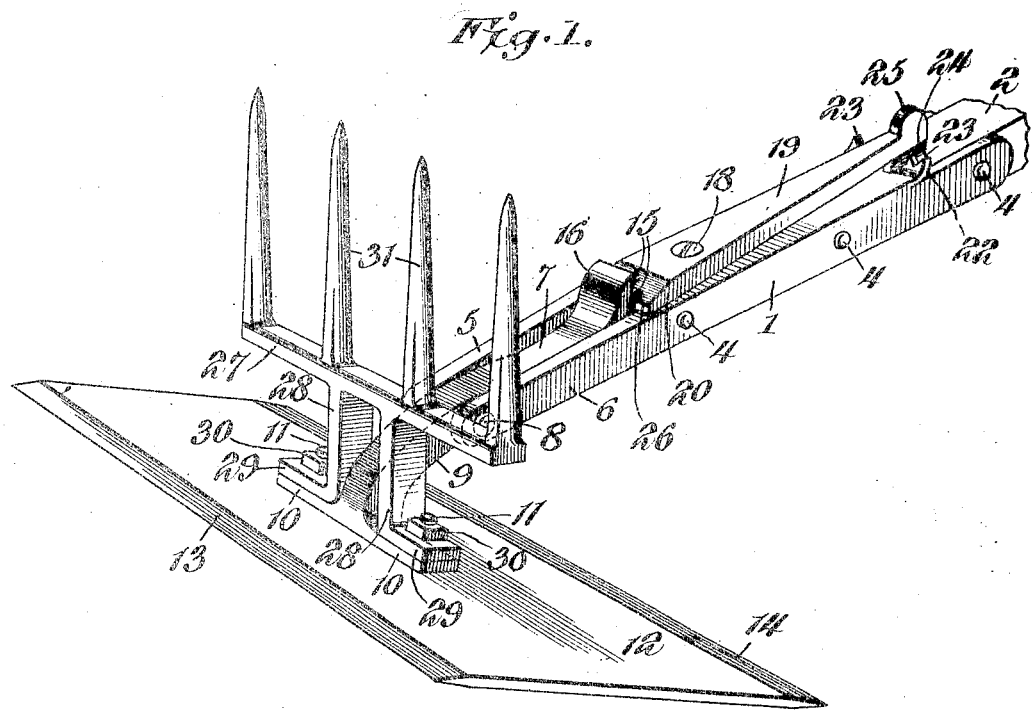
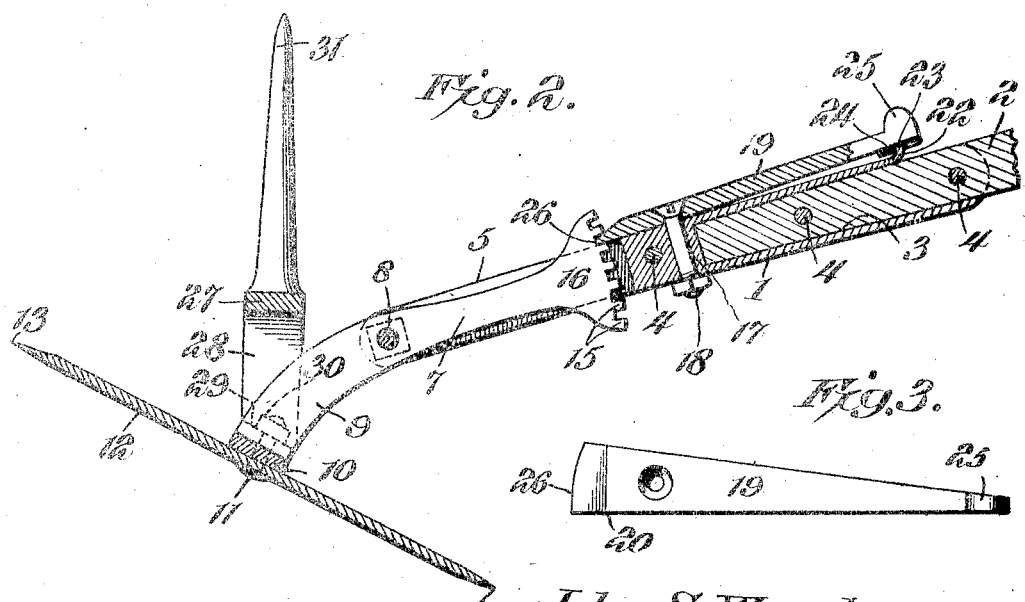
John S. Ward, INVENTOR
WITNESSES
ATTORNEY

UNITED STATES PATENT OFFICE.

JOHN SWAYZE WARD, OF WEIMAR, TEXAS.

GARDEN IMPLEMENT.

1,089,298. Specification of Letters Patent. Patented Mar. 3, 1914.

Application filed November 9, 1912. Serial No. 730,467.

*To all whom it may concern:*

Be it known that I, JOHN S. WARD, a citizen of the United States, residing at Weimar, in the county of Colorado and State of Texas, have invented a new and useful Garden Implement, of which the following is a specification.

This invention relates to improvements in garden or field hand implements.

The object is to provide a device for garden or field use which combines, in one tool, a hoe or weeder adapted to turn over the soil and to cut the roots of grass and weeds in the manner of a scuffle hoe, and also a rake which may be used in the ordinary manner by simply reversing the device.

Another object is to provide means, in an implement of this character, for adjusting the pitch or angle of the hoe blade, as well as the angle of the rake teeth, with relation to the handle, in order to adapt the same for various purposes in the use of the implement and to lock the operative parts in their adjusted position.

With these and other objects in view, the invention consists in the novel construction hereinafter fully described, illustrated in the accompanying drawing and pointed out in the claims hereto appended; it being understood that various changes in the form, size, proportion and minor details of construction, within the scope of the appended claims, may be resorted to without departing from the spirit or sacrificing any of the advantages of the invention.

In the drawing forming part of this specification and in which similar reference numerals designate corresponding parts throughout the several figures—Figure 1 is a perspective view of the combined hoe and rake with a portion of the manipulating handle thereof. Fig. 2 is a longitudinal sectional view of the same. Fig. 3 is a detail plan view showing the locking lever.

In the preferred embodiment of the invention, as shown in the drawing, a socket member 1 is provided, comprising means for attaching an operating handle 2 which may be of any desired length. The handle is tapered to fit the socket 3 of the member 1, and is secured therein by bolts or rivets 4 thereby forming a rigid connection between the two parts.

The socket member 1 has forwardly extending side arms 5 and 6, spaced apart and adapted to receive between them a shank member 7, provided intermediate its length with a perforation registering with similar perforations in the ends of the forwardly extending side arms 5 and 6 for the reception of a horizontal pivotal bolt 8, which permits of the adjustment of the shank member 7 and the parts carried thereby.

The shank member is provided at its forward end with a downwardly extended foot portion 9 having outwardly projecting lugs 10 formed integral therewith and adapted to receive bolts 11 for the purpose of attaching a hoe blade 12 thereto. The hoe blade is of rectangular form and is provided along its front and rear sides with cutting edges 13 and 14 and may be reversed to present either edge in front when desired.

The rearwardly extending shank 7 is provided, at its inner extremity and beyond the pivot bolt 8, with a series of teeth 15 formed on an arcuate enlargement 16, the curve of said enlargement being concentric with the pivot bolt 8, and it is adapted to pass freely between the arms 5 and 6 when disengaged from the locking means to be presently described.

The member 1, as will be seen by the drawing, is provided immediately in rear of the handle socket 3, with a vertically disposed perforation 17 for the reception of a bolt 18 which forms a pivot for a locking lever 19 mounted upon the top side of the socket member 1, and provided on its lower end with a flared or widened tooth-engaging portion 20 having its upper face beveled to adapt the same to readily enter between any of the teeth 15 of the shank member 7, in order to rigidly hold the same at any desired adjustment.

In order to prevent the locking lever from moving laterally, during the manipulation of the implement, the socket member 1 is provided at its upper end with an upturned flange 22, preferably formed integral therewith and having its upper edge serrated, thus forming teeth 23 to be engaged by a depending lug 24, which is provided on the lower side of the locking lever and at the end farthest removed from the hoe blade 12. To render the locking lever 19 easy to manipulate, it is provided with a thumb piece 25, at its upper end and on the opposite side from the tooth-engaging lug 24, the said thumb piece 25 enabling the user of the device to readily press the locking lever 19 to one side and thus disengage the tooth or lug 24 from the serrations 23 to change the angle of the hoe blade 12 with relation to the longitudinal axis of the manipulating handle 2.

The flared or widened tooth engaging portion 20 of the locking lever 19 has its edge 26 formed on a curve eccentric to the pivotal bolt 18, so that, when the said lever is forced into its locking position and the lug 24 is seated in the proper serration 23 to insure such locked relation, the eccentric or cam-edge 26 will frictionally engage or wedge between the teeth 15 and thus provide additional rigidity to the locked relation of the several parts. This is clearly shown in Fig. 3 of the drawing.

The invention as thus far described consists of an adjustable hoe only and the same may be used as such. Means have been provided, however, for attaching a rake member to the device, thus making a combination implement that will render the same a most useful tool for garden purposes. To this end a rake bar 27 of any desired length is provided, having intermediate of its length, downwardly extending legs 28, the same terminating in outwardly projected feet 29 having suitable perforations to receive the upper ends of the bolts 11 in order to bind the same rigidly to the lugs 10 through the medium of the nuts 30. The rake bar 27 is provided, on its upper side, with a series of upstanding rake teeth 31 which have approximately the same angle with relation to the manipulating handle 2 as the hoe blade 12 in the position shown in the drawing, but it will be readily seen that by releasing the locking means for the shank member 7, any desired angle of adjustment may be secured for either the hoe blade or the rake teeth. It will further be seen that a simple combination implement has been provided that is easy to adjust and one that is strongly constructed and has few parts to wear out, being made of steel or other metal with the exception of the handle.

What is claimed is:—

1. A device of the class described, including a handle member, having longitudinally extending arms, a shank member pivotally mounted between said arms, a blade secured to the outer or lower end of said shank member, an arcuate series of teeth formed on the inner end of the shank member concentric with the pivot thereof, a locking lever pivotally mounted on the handle member and adapted to swing laterally into and out of engagement between the teeth of the shank member, and means for holding the said locking lever in such engagement.

2. A device of the class described, including a socket member adapted to have an operating handle fitted in its socket, forwardly extended arms provided on the socket member, a hoe blade having its shank member pivotally mounted between said arms, a toothed segment formed on the inner end of the shank member, a locking lever pivotally mounted upon one of the faces of the socket member and having a tooth-engaging end adapted to swing laterally into and out of engagement between the teeth of said segment, said socket member having outwardly projecting teeth arranged in the path of movement of the said lever, and a downwardly extending tooth provided on said lever to engage one of the teeth of the socket member.

3. A device of the class described comprising a blade, a shank secured rigidly to said blade and having its free end formed with a toothed segment, a handle member provided with forwardly extending arms, means for pivoting the shank to said arms, a locking lever pivoted on the handle member and having one end widened and beveled to enter between the teeth of the shank, the edge of said widened and beveled end of said lever being disposed eccentric with the pivot thereof so as to provide a wedging engagement between the tooth-engaging portion of said lever and the teeth of said segment.

In testimony, that I claim the foregoing as my own, I have hereto affixed my signature in the presence of two witnesses.

JOHN SWAYZE WARD.

Witnesses:
P. J. SHOVER,
R. L. WILLIAMS.